May 24, 1927.  1,629,496
J. FRASER
FOOT ACTUATED VALVE
Filed Feb. 23, 1922
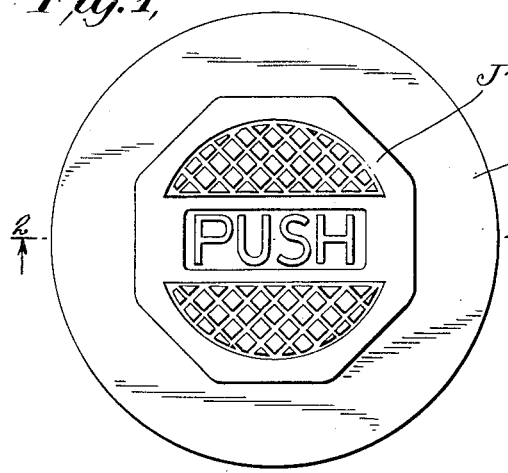
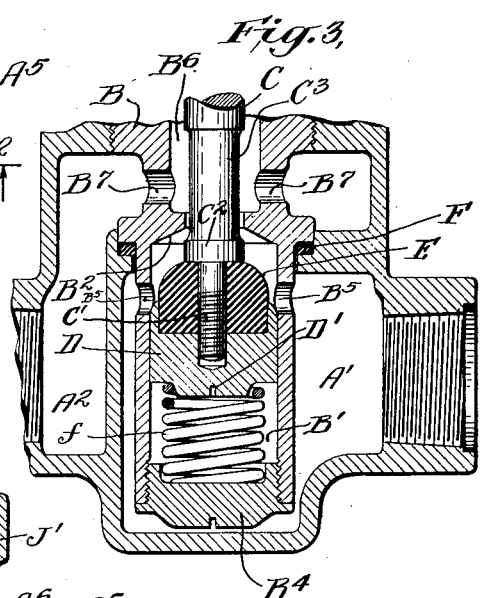
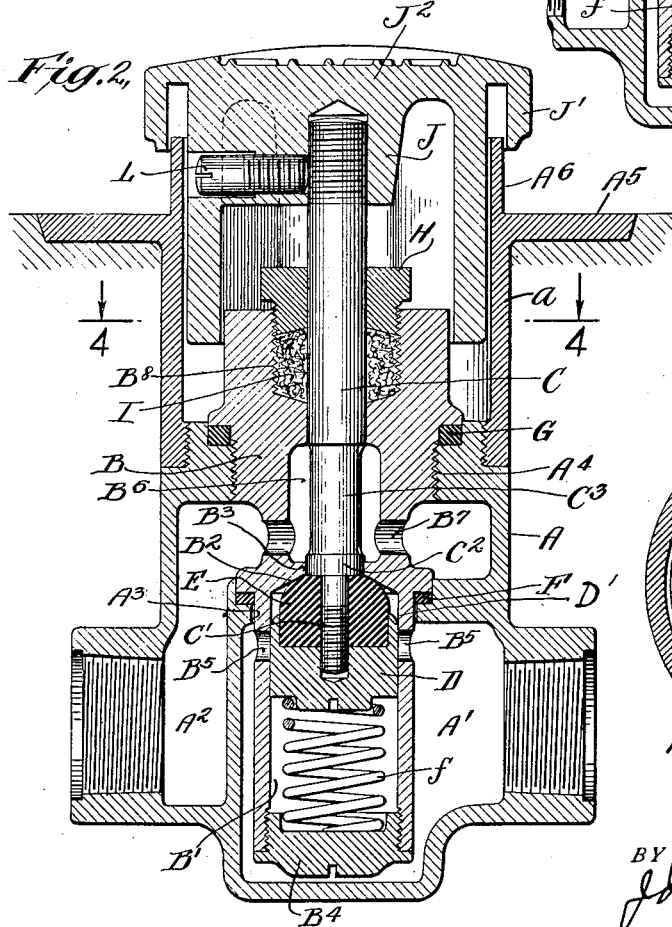
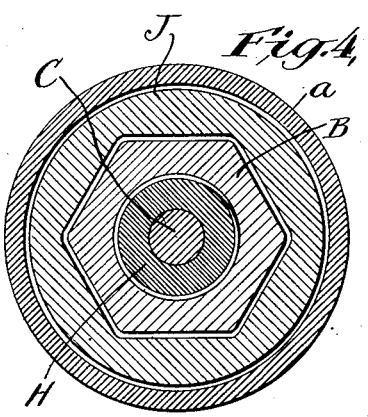
INVENTOR
James Fraser
BY John E. Hubbell
his ATTORNEY Patented May 24, 1927.

1,629,496

UNITED STATES PATENT OFFICE.

JAMES FRASER, OF EDGEMOOR, DELAWARE, ASSIGNOR TO SPEAKMAN COMPANY, OF WILMINGTON, DELAWARE, A CORPORATION OF DELAWARE.

FOOT-ACTUATED VALVE.

Application filed February 23, 1922. Serial No. 538,444.

The general object of my present invention is to provide improvements in valve mechanism especially adapted for use in a foot actuated valve, and my invention comprises improvements facilitating the ready removal of the valve and valve seat members from the valve casing and tending to prevent the entrance of dirt or water into the valve casing or operating parts of the valve mechanism when the latter is imbedded in the floor of a building with the pipe connections thereto located below the floor. The invention also comprises improvements in the valve operating mechanism tending to make the operation of the valve easy and reliable, and minimizing the tendency of the valve to chatter or hammer when the latter is seated in the floor of a building.

The various features of novelty which characterize my invention are pointed out with particularity in the claims annexed to and forming a part of this specification. For a better understanding of the invention, however, and its advantages, reference should be had to the accompanying drawings and descriptive matter in which I have illustrated and described preferred embodiments of the invention.

Of the drawings:

Fig. 1 is a plan view;

Fig. 2 is a section on the line 2—2 of Fig. 1 showing the valve in its closed position;

Fig. 3 is a section taken similarly to Fig. 2 showing a portion of the valve mechanism in the valve open position; and Fig. 4 is a section on the line 4—4 of Fig. 2.

My improved valve, in the form illustrated in the drawing comprises a valve body or casing element A provided at its lower end with an inlet chamber A' and an outlet chamber $A^2$ which are separated by a partition including a horizontal portion in which there is formed an opening $A^3$ for a valve guiding and valve seat member B. The latter comprises an upper body portion which is externally threaded and is screwed into the threaded opening $A^4$ in the top wall of the portion of the outlet chamber $A^2$ projecting over the opening $A^3$. An axial passage for the movable valve member C is formed in the member B. The lower portion of this passage is enlarged to form a dash pot or cushioning chamber B' in which works a metallic piston D secured to a threaded extension C' of the valve member C. The piston D is formed with a kerf D' in its lower end for engagement by a screw driver, and forms a clamping nut for securing a valve seat engaging member, or valve E proper, between the piston D and the lower end $C^2$ of the valve member C. The valve E is normally held against the conical valve seat $B^2$ which forms the upper wall of the chamber B' at the margin of the central or port passageway $B^3$ by a spring $f$ which is seated in the lower portion of the chamber B' and acts between the piston D and a cap $B^4$ threaded into and closing the lower end of the chamber B'.

When the valve member C is depressed communication is established between the inlet and outlet chambers A' and $A^2$ respectively, through ports $B^5$ in the wall of the chamber B', the port $B^3$, the enlargement $B^6$ of the valve stem passage above the port $B^3$ and the lateral ports $B^7$. Advantageously as shown, the portion $C^2$ of the valve member C snugly fills the port $B^3$ when the valve is closed, but the portion $C^3$ of the valve member above the portion $C^2$ is reduced in diameter so that when the valve member is depressed, an annular flow passage exists between the margin of the port $B^3$ and the reduced portion $C^3$ of the valve member.

To prevent leakage along the joints between the member B and the walls of the valve casing passages $A^3$ and $A^4$, I provide packing washers F and G. Advantageously the passages $A^3$ and $A^4$ and the corresponding portions of the member B are shouldered as shown to enclose the washers F and G. To insure the effective utilization of both of these washers, one of them, as for instance the washer F, may be made of comparatively hard material, while the other washer is made of a softer and more compressible material. To prevent leakage along the valve member C through the passage provided for the latter through the member B, I advantageously provide a stuffing box chamber $B^8$ in the upper end of the member B and a gland H for compressing the packing I in the chamber $B^8$ snugly about the cylindrical portion of the valve member C passing through the stuffing box.

The upper end of the valve member C is secured to a valve actuating member J. As shown the upper end of the member C is threaded and is screwed into a socket formed in the underside of the member J and is normally locked in this socket by means of a clamping screw L. The member J is cup shaped and has its cylindrical body received loosely in the upper end of the valve casing extenison a. The latter, as shown is in threaded engagement with the valve casing body A though it might be integrally connected with the latter and is formed with an external flange A⁵, the upper surface of which is flush with the floor level in the normal intended mounting of the valve. A cylindrical portion A⁶ of the casing extension a projects above the flange A⁵, and is telescopically received in an annular recess formed between the body of the actuating member J and a skirt or depending flange J' from the head J² of the member J.

In the assembled valve, the upper end of the member B is telescopically received in the cup shaped body of the member J, and the telescoping portions of the members B and J are shaped to prevent relative rotation of the parts about their common axis. For this purpose the telescopic ports are made hexagonal in cross section as shown in Fig. 3. The head J² of the member J is also shown as hexagonal in outline to permit its ready rotation by a wrench.

With the described construction, the valve may be disassembled and the valve mechanism proper removed for cleaning, inspection or repairs by applying a wrench to the hexagonal upper end of the actuating member J and rotating the latter in the proper direction. This, through the engagement of the wall of the hexagonal chamber in the member J with the hexagonal upper portion of the member B unscrews the latter from the threaded opening A⁴ in the valve body A. To reassemble the valve, it is only necessary to screw the parts back into position by a reverse operation. The extension of the valve casing A⁶ above the flange A⁵ to a level above that of the bottom of the encircling flange or skirt J' prevents water and dust from being carried into the valve mechanism in floor scrubbing or sweeping operations.

The valve is opened by pressing down on the valve actuated member J. Normally this pressure is applied by the foot of the operator. When the pressure on the valve actuated member J is relieved the valve closes under the action of the spring f. The piston D and the chamber B' in which it works form a cushion device which tends to prevent the valve from chattering or hammering, and the tendency to valve chatter and hammering is minimized also by the fact that the tapering of the upper portion of the piston D as indicated at D' and the snug fit of the valve portion C² in the port B³, provide a graduated variation in the rate of flow through the valve during the initial opening and final closing movements of the valve.

While in accordance with the provisions of the statutes I have illustrated and described the best forms of my present invention now known to me, it will be apparent to those skilled in the art that changes may be made in the form of my invention without departing from the spirit of my invention as set forth in the appended claims, and that certain features of my invention may sometimes be used to advantage without a corresponding use of other features.

Having now described my invention, what I claim as new and desire to secure by Letters Patent, is:

1. A foot valve comprising a valve casing and adapted to be imbedded in a floor and formed with an outwardly extending flange at the floor level and with a cylindrical portion projecting above said flange and open at its upper end, and a movable valve actuating member mounted in said casing and covering said upper end portion of said casing and comprising a depending cylindrical skirt portion which surrounds said upper end portion of the casing.

2. A valve mechanism comprising a valve body formed with inlet and outlet chambers and with an opening in its upper side, a valve guiding and seat member in threaded engagement with said valve body and forming a closure for said opening and also forming a portion of the partition separating the valve inlet and outlet chambers, an axially movable valve member mounted in said valve seat member, an external valve actuating member secured to said valve member and in splined engagement with said valve seat member whereby the valve may be opened and closed by axial movements of said actuator and said valve guiding and seat member can be unscrewed from the casing by rotating said actuating member.

3. A foot valve comprising a valve casing having a cylindrical open upper end portion and adapted to be imbedded in a floor with said upper end portion projecting above the floor level, and a movable valve actuator covering said portion of said casing and comprising a depending body portion extending into, and a depending cylindrical skirt portion which surrounds said upper end portion.

4. In a valve the combination with a valve casing formed with inlet and outlet chambers separated by a partition containing an opening and having an aligned opening in the outer wall of the outlet chamber, of a valve guiding and seat member extending through and closing both of said casing openings and formed with a valve controlled passageway connecting said chambers, a valve mounted in said member and controlling flow through said passageway, packing washers at the margins of each of said openings, one of said washers being formed of material more readily compressible than the other, said casing and member being provided with shoulders for engaging the opposite sides of said washers.

5. In a valve the combination with a valve casing formed with inlet and outlet chambers separated by a partition containing an opening and having an aligned opening in the outer wall of the outlet chamber, of a one piece valve guiding and valve seat member extending through and closing both of said casing openings and formed with an axial passage open at its ends and being enlarged at its inner end to provide a valve and valve cushion chamber, a removable closure for the inner end of said passage and a valve and cushion piston working in the last mentioned chamber and controlling flow between the last mentioned chamber and the adjacent portion of said passage, said member being formed with lateral ports connecting said cushion chamber to the valve inlet chamber and with a second set of lateral ports connecting said passage to the outlet chamber.

Signed at Wilmington in the county of New Castle and State of Delaware this seventeenth day of February A. D. 1922.

JAMES FRASER.